Aug. 9, 1955 F. JARDINE 2,715,052
COLLAPSE RESISTANT PISTON
Filed Dec. 23, 1953 2 Sheets-Sheet 1
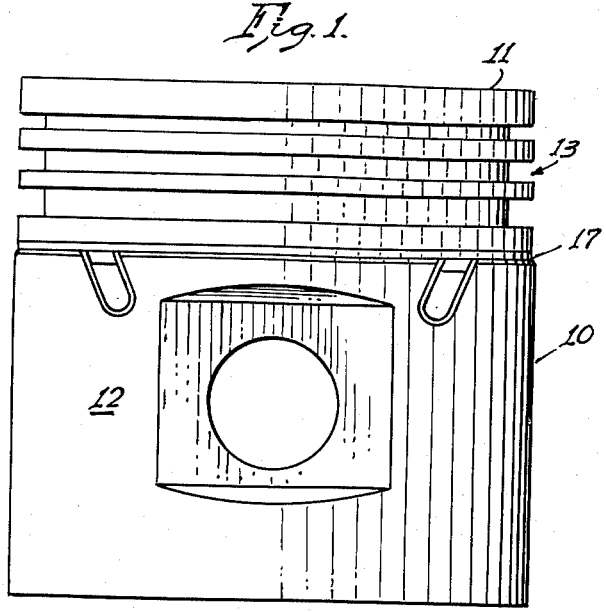
Fig. 1.
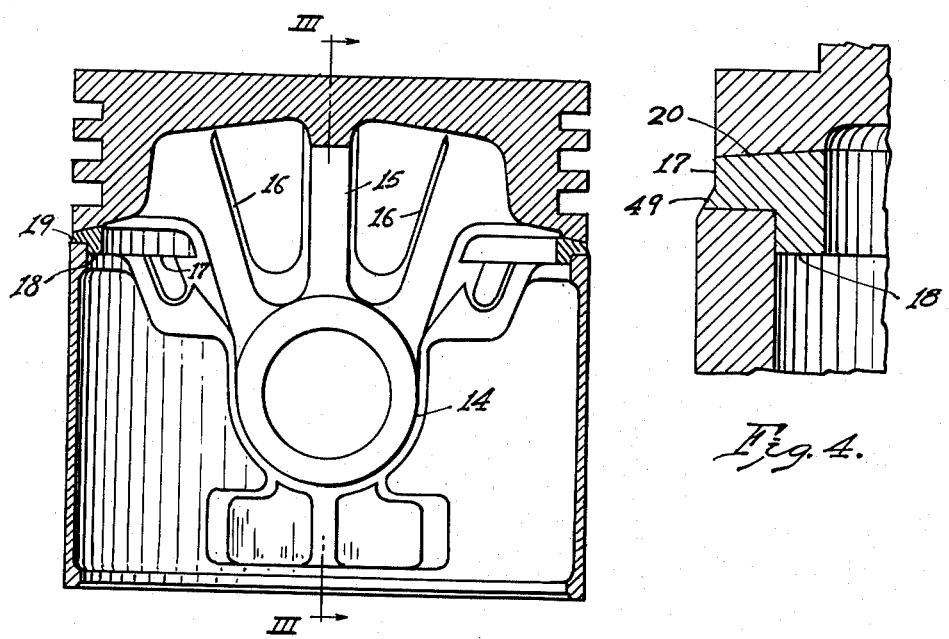
Fig. 2.
Fig. 4.
INVENTOR.
FRANK JARDINE
BY George B. Todd
ATTORNEY.

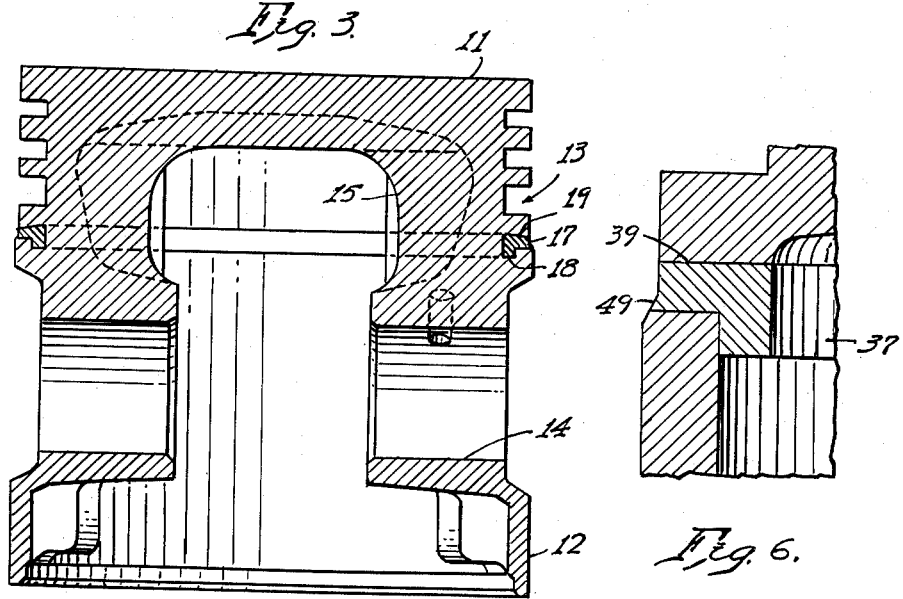
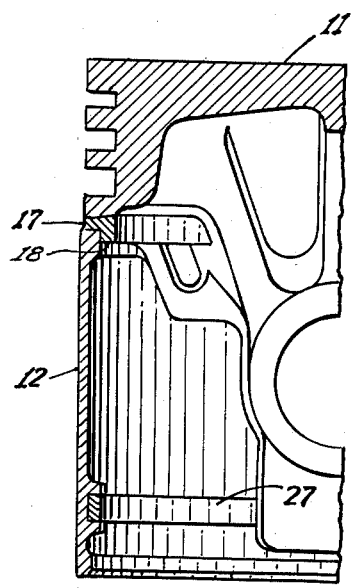

2,715,052

COLLAPSE RESISTANT PISTON

Frank Jardine, Shaker Heights, Ohio, assignor to Aluminum Company of America, Pittsburgh, Pa., a corporation of Pennsylvania Application December 23, 1953, Serial No. 400,010

6 Claims. (Cl. 309—12)

This invention relates to pistons for internal combustion engines, and particularly to light metal pistons such as those made of magnesium or aluminum or their alloys for use in cylinders of cast iron, aluminum or the like. Specifically, the invention is directed to a piston designed to meet problems resulting from recent trends in engine design.

The opposing demands for higher power in pleasure cars and for styling which limits the overall dimensions of the engine power plant have brought about the adoption of larger cylinder bore sizes for a given engine length, as in V-type engines, high compression ratios, decreased stroke and decreased length of connecting rod in proportion to the stroke. The decreased stroke and connecting rod length require shorter piston skirts for reasons of clearance in operation. The combined effect of the shorter connecting rod, shorter stroke, shorter skirt and the higher cylinder pressures accompanying high compression ratios is the development of a greater side thrust or component of the connecting rod force. This side thrust, which is perpendicular to the cylinder wall, is resisted largely by the piston skirt, which must support an additional load in the dynamic force with which the connecting rod resists change in direction in accelerating or decelerating, giving rise to a torque reaction at the ends of the connecting rod. It is seen therefore that one effect of modern trends in engine design is to increase piston skirt loading and the consequent change in skirt contour which is commonly called collapse.

The problem of collapse in service is aggravated by features of modern piston design which are dictated by the needs for quietness in operation and reduced wear. The room temperature and operating clearances of the piston in the cylinder must be such as to prevent "cold slap" in starting at low temperatures, as well as scuffing and scoring of the skirt and cylinder wall at operating temperatures. These requirements have led gradually to a piston design characterized by a relatively thin, resilient skirt that can conform to the cylinder wall under the extremes of operating conditions, and a relatively heavy head section with ample ribbing or column support under the head to resist deformation under the loading imposed by high compression ratios, the head and skirt being separated by slots over the thrust faces of the piston to permit head and skirt to expand independently and to contribute to conformation of skirt wall with cylinder wall. The thinner skirt, however, is more subject to collapse. In aluminum alloy pistons, because of the phenomenon of growth at prolonged high temperatures, objectionable distortion in the skirt may become permanent due to permanent change in head dimensions.

Collapse of the skirt in service also disturbs the balance of thermal stresses which helps to control skirt contour. This thermal control normally is present in high degree in aluminum alloy pistons having a horizontal slot intermediate the head and skirt because of an inherent balance of thermal stresses. As the head and wrist pin bosses, which are of relatively heavier section and operate at relatively high temperatures, expand axially of the wrist pin bosses, the skirt at the thinner and cooler thrust faces is placed under tension, exerting a compression force along the wrist pin axis. Thus, while these parts expand differentially, they are so situated that expansion in the one is restrained by tension in the other. This balance of thermal stresses can be improved by piston design, but is impaired by collapse at the thrust faces.

It is an object of this invention to provide a piston meeting the requirements of modern engine design but in which the effect of side thrust components of the connecting rod forces is minimized, and collapse of the skirt due to that force or other causes is prevented or greatly reduced. Other objects and advantages will appear in the following description, reference being had to the accompanying drawings, in which:

Fig. 1 is a side-elevational view of a piston made in accordance with my invention;

Fig. 2 is a cross sectional view on a plane perpendicular to the wrist pin axis;

Fig. 3 is a cross sectional view on the line III—III of Fig. 2.

Fig. 4 is an enlarged detail of a portion of Fig. 2;

Fig. 5 is a partial cross sectional view similar to Fig. 2 but illustrating a modified form of the invention; and Fig. 6 is a view similar to Fig. 4 but illustrating another modification.

Referring now to the drawings, 10 represents a light metal piston having a head 11 and a skirt 12. The head has a ring belt 13, and wrist pin bosses 14 are provided in the skirt and supported from the head by integral columns 15 and ribs 16. These parts are of conventional form and may be varied to any desirable degree.

Between the head 11 and the skirt 12, I provide a steel ring 17 which is angular in cross section, having a vertical flange 18 and a horizontal, outwardly extending flange 19 at the top of flange 18. Over the thrust faces of the piston, the vertical flange 18 bears upon the upper, inner face of the skirt 12, while the horizontal flange 19 extends into horizontal slots between the head and skirt intermediate the wrist pin bosses.

In the form shown in Figs. 2, 3 and 4, which is preferred, the horizontal flange 19 is tapered outwardly by bevelling the top surface of the ring 17, as shown most clearly at 20 in Fig. 4. The purpose of this is to permit the head to expand without binding upon the ring, and the degree of taper will be dependent upon the design of the head and the operating temperatures to which it is subjected. Accordingly the taper may range from 2° to 30° and usually will be between 10° and 20°.

Over the wrist pin bosses, the ring 17 is embedded in the boss supporting structure, with only the outer edge of the horizontal flange exposed, but is not intended to be bonded thereto, as any bonding would prevent the desired freedom of movement. Any bonding that does occur in casting is broken due to differential expansion when the piston is aged.

It will be seen that a piston according to my invention may be provided with heavy head section, heavy supporting columns between wrist pin bosses and head and ample ribbing under the head. The function of the slotted piston in permitting expansion of the head independently of the skirt is retained, while the effect of the slot as a heat dam is reduced, when the ring bears against the head and skirt and, although less conductive than the metal of the piston, allows the dissipation of some head heat to the skirt. The ring also provides greater rigidity in the piston over that of the conventional slotted structure, which is particularly advantageous in pistons of shorter design. The vertical flange of the ring supports the thrust faces of the skirt against the change in thrustwise dimension known as collapse, and resists contraction of the skirt during cooling. Yet there is no interference with expansion of the skirt at the thrust faces nor with the resiliency of the skirt which complement each other to maintain proper fit of the piston in the cylinder in all operating conditions. The steel ring tends to maintain its circular outline, and all the more so since it is not bonded to the piston material, and so resists change in dimension across the wrist pin bosses which otherwise would cause distortion of the skirt. At operating temperatures, the resistance of the ring to distortion exerts a compression force axially of the wrist pin bosses which is added to the restraining tension in the skirt and so improves the balance of thermal stresses.

Some of the advantages noted may be of lesser importance in certain types of pistons, and modifications of the invention are contemplated in such cases.

In Fig. 5 I have shown a piston having the head 11, skirt 12 and ring 17 described above. In addition, I provide a flat steel ring 27 adjacent the lower end of the skirt which is designed with a thickened portion having a groove to receive the ring 27. This structure provides greater stiffness and resistance to collapse across the thrust faces, but resists flexing of the skirt inwardly and so would be used only where resilience in the skirt is of lesser importance due to other features of the design or to operational conditions.

The modification shown in Fig. 6 also would be useful with special types of pistons and for special operating conditions in which the binding of the head upon the ring between head and skirt due to expansion or growth of the head would not be objectionable. In this form of the invention, the top surface of the ring 37 is flat so that the horizontal flange 39 does not taper.

The edge of the ring exposed at the outer surface may be of any form so long as it does not bear upon the cylinder wall. Since, normally, the ring belt section of a piston is of lesser diameter than the skirt, this edge may be provided with a talus 49, Figs. 4 and 6, which complements a bevel at the upper end of the skirt to provide a smooth surface.

I am aware that ferrous metal rings have been provided in light metal pistons, and that the purported purpose of some of these has been to provide thermal control. Most such attempts have been at the cost of an increased tendency to collapse or increased distortion, or less resilience in the skirt, or less accurate clearances at one or the other extreme of temperature encountered in service. Since aluminum alloy pistons of this general design, in which head and skirt are separated at the thrust faces, have inherent control to a high degree, my invention is concerned only incidentally with this property. Primarily it is concerned with preventing collapse, while providing optimum clearances at starting and operating temperatures, resisting skirt distortion and maintaining or improving the balance of thermal stresses.

While I have described my invention in terms of an aluminum alloy piston and a steel ring, it will be understood that its principles are applicable to any piston for use in a cylinder having a lower coefficient of expansion and of such required design as to tend to collapse in service and incur the related problems discussed herein.

I claim:

1. In a piston made of a metal having a higher coefficient of expansion than the metal of the cylinder in which it is to be used and comprising a head, a skirt, wrist pin bosses integral with the skirt and supporting structure integral with the head and wrist pin bosses, a metal ring free of any bonding to the metal of the piston and having a horizontal flange interposed the head and skirt and a vertical flange bearing on the upper, inner face of the skirt between the wrist pin bosses and embedded in the boss supporting structure, the metal of said ring having a coefficient of expansion not greater than that of the metal of the cylinder.

2. In a light metal piston comprising a head, a skirt, wrist pin bosses integral with the skirt and supporting structure integral with the head and wrist pin bosses, a ferrous metal ring free of bonding to the metal of the piston and having a horizontal flange interposed the head and skirt and a vertical flange bearing on the upper, inner face of the skirt between the wrist pin bosses and embedded in the boss supporting structure.

3. In a light metal piston comprising a head, a skirt, wrist pin bosses integral with the skirt and supporting structure integral with the head and wrist pin bosses, a ferrous metal ring free of bonding to the metal of the piston and having a horizontal flange interposed the head and skirt and bevelled on its top surface to provide an outward taper and a vertical flange bearing on the upper, inner face of the skirt between the wrist pin bosses and embedded in the boss supporting structure.

4. In an aluminum alloy piston comprising a head, a skirt, wrist pin bosses integral with the skirt and supporting structure integral with the head and wrist pin bosses, a steel ring free of any bonding to the metal of the piston and having a horizontal flange interposed the head and skirt and bevelled on its top surface to provide an outward taper and a vertical flange bearing on the upper, inner face of the skirt between the wrist pin bosses and embedded in the boss supporting structure.

5. In an aluminum alloy piston comprising a head, a skirt, wrist pin bosses integral with the skirt and supporting structure integral with the head and wrist pin bosses, a steel ring free of any bonding to the metal of the piston and having a horizontal flange interposed the head and skirt and bevelled on its top surface to provide an outward taper of 2° to 30° and a vertical flange bearing on the upper, inner face of the skirt between the wrist pin bosses and embedded in the boss supporting structure.

6. In an aluminum alloy piston comprising a head, a skirt, wrist pin bosses integral with the skirt and supporting structure integral with the head and wrist pin bosses, a steel ring free of any bonding to the metal of the piston and having a horizontal flange interposed the head and skirt and bevelled on its top surface to provide an outward taper of 10° to 20° and a vertical flange bearing on the upper, inner face of the skirt between the wrist pin bosses and embedded in the boss supporting structure.

References Cited in the file of this patent

UNITED STATES PATENTS

| Number | Name | Date |
|---|---|---|
| 1,750,429 | Pope | Mar. 11, 1930 |
| 1,784,291 | Jardine | Dec. 9, 1930 |
| 1,874,925 | Diamond | Aug. 30, 1932 |
| 1,985,699 | Teetor | Dec. 25, 1934 |

FOREIGN PATENTS

| Number | Country | Date |
|---|---|---|
| 781,384 | France | May 15, 1935 |